(12) United States Patent
Wang

(10) Patent No.: US 11,115,285 B2
(45) Date of Patent: Sep. 7, 2021

(54) DEVICE DETECTION

(71) Applicant: NEW H3C TECHNOLOGIES CO., LTD., Hangzhou (CN)

(72) Inventor: Weifeng Wang, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 322 days.

(21) Appl. No.: 16/303,955

(22) PCT Filed: Jul. 17, 2017

(86) PCT No.: PCT/CN2017/093173
§ 371 (c)(1),
(2) Date: Nov. 21, 2018

(87) PCT Pub. No.: WO2018/019146
PCT Pub. Date: Feb. 1, 2018

(65) Prior Publication Data
US 2020/0322223 A1 Oct. 8, 2020

(30) Foreign Application Priority Data
Jul. 28, 2016 (CN) .......................... 201610607515.7

(51) Int. Cl.
*H04L 12/24* (2006.01)
*H04L 12/46* (2006.01)

(52) U.S. Cl.
CPC .......... *H04L 41/12* (2013.01); *H04L 12/4641* (2013.01)

(58) Field of Classification Search
CPC ..... H04L 12/4641; H04L 41/12; H04L 49/70; H04L 61/103
See application file for complete search history.

(56) References Cited

U.S. PATENT DOCUMENTS 7,516,487 B1 4/2009 Szeto et al.
8,724,638 B1* 5/2014 Carrie ................. H04L 12/4641
370/395.53

(Continued)

FOREIGN PATENT DOCUMENTS

CN 103532858 A 1/2014
CN 103763146 A 4/2014
(Continued)

OTHER PUBLICATIONS

Japanese Patent Office, Office Action Issued in Application No. 2019-504776, dated Jan. 7, 2020, 7 pages. (Submitted with Machine Translation).

(Continued)

*Primary Examiner* — Eric Nowlin
(74) *Attorney, Agent, or Firm* — McCoy Russell LLP

(57) ABSTRACT

A Software Defined Network (SDN) controller receives a detecting packet reported by a first switch and initiated by a first device. The SDN controller sends, for each of switches having an SDN connection with the SDN controller, the detecting packet and information of all downlink ports of the switch to the switch in a way that the switch is capable of sending the detecting packet through the downlink port. The SDN controller receives a response packet which is sent by a second switch and initially generated by a second device in response to receiving the detecting packet from the second switch, wherein an IP address of the second device matches a destination IP address of the detecting packet. The SDN controller sends forwarding configuration information to the second switch in a way that the second switch is capable of configuring a port through which the response packet is received.

13 Claims, 3 Drawing Sheets

(56) References Cited

U.S. PATENT DOCUMENTS

| | | | | |
|---|---|---|---|---|
| 8,787,388 | B1* | 7/2014 | Adams | H04L 43/0852 370/395.31 |
| 9,210,180 | B2* | 12/2015 | Zisapel | H04L 63/1416 |
| 9,276,877 | B1* | 3/2016 | Chua | H04L 45/38 |
| 9,742,588 | B2* | 8/2017 | Carrie | H04L 12/4641 |
| 10,142,160 | B1* | 11/2018 | Adams | H04L 41/12 |
| 10,630,575 | B2* | 4/2020 | Joshi | G06F 21/64 |
| 2013/0266015 | A1 | 10/2013 | Qu et al. | |
| 2014/0341223 | A1* | 11/2014 | Carrie | H04L 12/4641 370/395.53 |
| 2015/0043576 | A1* | 2/2015 | Dixon | H04L 12/184 370/390 |
| 2015/0071289 | A1* | 3/2015 | Shin | H04L 49/25 370/392 |
| 2015/0169340 | A1* | 6/2015 | Haddad | G06F 9/45533 718/1 |
| 2015/0200910 | A1* | 7/2015 | Yamada | H04L 61/103 370/254 |
| 2015/0281067 | A1* | 10/2015 | Wu | G06F 9/455 370/392 |
| 2015/0326524 | A1* | 11/2015 | Tankala | H04L 61/6022 709/245 |
| 2015/0358232 | A1 | 12/2015 | Chen et al. | |
| 2016/0330143 | A1* | 11/2016 | Song | H04L 45/42 |
| 2017/0063683 | A1* | 3/2017 | Li | H04L 45/74 |
| 2018/0167313 | A1* | 6/2018 | Qiao | H04L 45/64 |
| 2018/0309781 | A1* | 10/2018 | Tandel | H04L 12/22 |
| 2018/0375755 | A1* | 12/2018 | Joshi | H04L 45/745 |
| 2020/0304456 | A1* | 9/2020 | Ding | H04L 45/54 |
| 2020/0322223 | A1* | 10/2020 | Wang | H04L 12/4641 |
| 2021/0051175 | A1* | 2/2021 | Lyle | H04L 45/64 |

FOREIGN PATENT DOCUMENTS

| | | |
|---|---|---|
| CN | 103905577 A | 7/2014 |
| CN | 103944760 A | 7/2014 |
| CN | 105763414 A | 7/2016 |
| EP | 1551133 A1 | 7/2005 |
| JP | 2015531212 A | 10/2015 |
| JP | 2016048854 A | 4/2016 |
| WO | 2016095822 A1 | 6/2016 |

OTHER PUBLICATIONS

State Intellectual Property Office of the People's Republic of China, Office Action and Search Report Issued in Application No. 201610607515.7, dated Jul. 3, 2019, 6 pages. (Submitted with Partial Translation).

ISA State Intellectual Property Office of the People's Republic of China, Written Opinion of the International Searching Authority Issued in Application No. PCT/CN2017/093173, dated Sep. 27, 2017, WIPO, 4 pages.

European Patent Office, Extended European Search Report Issued in Application No. 17833449.6, dated Jun. 13, 2019, Germany, 8 pages.

ISA State Intellectual Property Office of the People's Republic of China, International Search Report Issued in Application No. PCT/CN2017/093173, dated Sep. 27, 2017, WIPO, 4 pages.

Japanese Patent Office, Office Action Issued in Application No. 2019-504776, dated Aug. 11, 2020, 7 pages. (Submitted with Machine Translation).

* cited by examiner

DEVICE DETECTION

CROSS REFERENCE TO RELATED APPLICATIONS

The present application is a U.S. National Phase of International Patent Application Serial No PCT/CN2017/093173 entitled "DEVICE DETECTION," filed on Jul. 17, 2017. International Patent Application Serial No. PCT/CN2017/093173 claims priority to Chinese Patent Application No. 201610607515.7, filed on Jul. 28, 2016. The entire contents of each of the above-cited applications are hereby incorporated by reference in their entirety for all purposes.

BACKGROUND

After a Virtual Extensible LAN (Vxlan) tunnel is established between switches in a Software Defined Network (SDN), an online host actively sends an Address Resolution Protocol (ARP) packet to a switch. The ARP packet carries an identifier of the VLAN (VLAN ID) to which the host belongs. The switch sends the ARP packet to an SDN controller so that the SDN controller issues a Permit Virtual Local Area Network (Permit Vlan) and mapping information of the Vlan and the Vxlan to a specified port of the switch according to the VlanID in the ARP packet after the host gets online.

DETAILED DESCRIPTION OF THE EMBODIMENTS

The technical solution in the examples of the present disclosure will be clearly and fully described in conjunction with the drawings in the examples of the present disclosure below. It will be apparent that the described examples are merely part of the examples of the present disclosure rather than all of the examples. All other examples obtained by those skilled in the art based on the examples of the present disclosure without making creative work fall within the scope of protection of the present disclosure.

The present disclosure will be described in further detail with reference to the accompanying drawings so that the purpose, the technical solution and the advantage of the present disclosure are clearer.

Referring to the description in the background, when it is needed that hosts in an SDN communicate with each other, if a destination host is a silent device not actively sending a packet, an SDN controller cannot perceive the presence of the silent device and cannot distribute forwarding configuration information (i.e., Permit Vlan and mapping information of Permit Vlan and Vxlan) to a switch connected to the silent device. Accordingly, other hosts cannot perform packet forwarding with the silent device through a Vxlan tunnel established among switches. For this purpose, in this example, by detecting presence of a silent device and distributing forwarding configuration information to a switch connected to the silent device, it may achieve that a host and the silent device communicate through a Vxlan tunnel.

Figure 1:
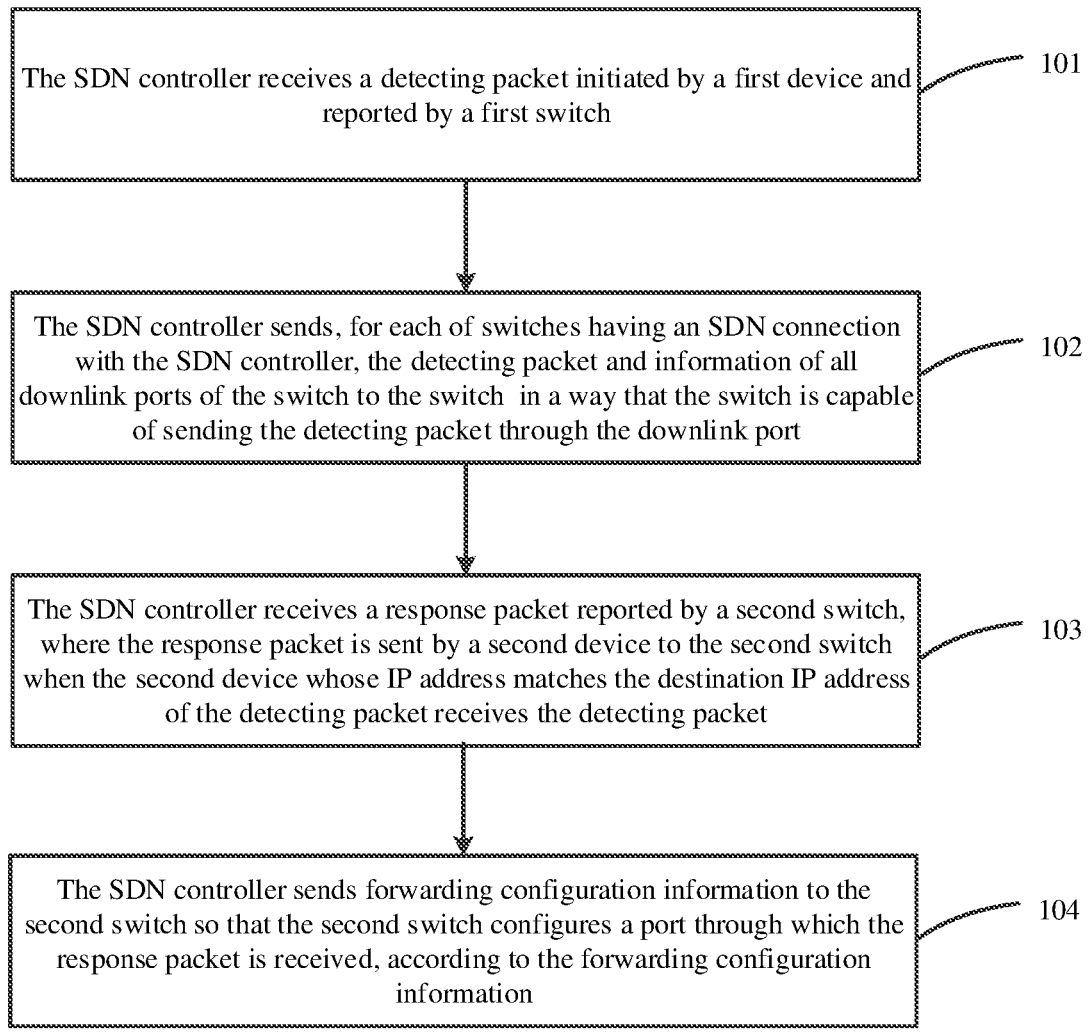
FIG. 1 is a schematic flow diagram of a method of detecting a device according to an example of the present disclosure.

FIG. 1 is a schematic flow diagram of a method of detecting a device according to the present disclosure. The method of detecting a device may be applied to an SDN controller. To clarify the example, a device initiating a detection is referred to as a first device; an object to be detected, i.e., a silent device, is referred to as a second device; a switch accessed by the first device is referred to as a first switch; and a switch accessed by the second device is referred to as a second switch. Both the first device and the second device in this example refer to a host, for example, a virtual machine (VM), a server, or the like.

The method includes the following blocks.

At block 101: an SDN controller receives a detecting packet initiated by a first device and reported by a first switch.

The detecting packet is a broadcast packet, such as an ARP request packet. The detecting packet is initially sent by a host initiating the detection. Hereinafter, the host initiating the detection may be referenced to as the first device. The switch accessed by the host (i.e., the above first switch) sends the detecting packet to the SDN controller after receiving the detecting packet. The interaction between the switch and the SDN controller is based on an SDN connection. In this example, the SDN connection may be implemented by the OpenFlow protocol. When a detecting packet is to be sent by the switch to the SDN controller, the detecting packet may be encapsulated into a packet suitable for transmission via the SDN connection. Similarly, when the SDN controller sends data to the switch, the principle is also applied.

It is conditional about whether the packet received by the switch is to be transmitted to the SDN controller. In this example, the switch may search for an egress port according to a destination Media Access Control (MAC) address of the received packet. For example, if packet forwarding is to be performed through the VXLAN tunnel between the switches, information of an egress port may be obtained by querying a MAC table in which a mapping relationship among the MAC address, the identifier of VSI/VXLAN, and the egress port is recorded. Since the detecting packet is a broadcast packet, that is, the destination MAC address in the Ethernet header of the detecting packet is a broadcast address, and MAC addresses recorded in the MAC table are not a broadcast address, a corresponding egress port cannot be found according to the destination MAC address in the Ethernet header of the second detecting packet. Therefore, the switch cannot forward the detecting packet through the VXLAN tunnel, so the switch may send the detecting packet to the SDN controller.

At block 102: The SDN controller sends, for each of switches having an SDN connection with the SDN controller, the detecting packet and information of all downlink ports of the switch to the switch in a way that the switch is capable of sending the detecting packet through the downlink port.

The SDN controller may encapsulate the detecting packet and the information of the downlink ports into a packet suitable for being transmitted via the SDN connection. For each switch that establishes an SDN connection with the SDN controller, the SDN controller may construct such a packet. For different switches, the information of the downlink ports carried in the packet is different.

The information of the downlink ports may be reflected in a port list. For any of the switches, the port list contains information of all the downlink ports of the switch. However, for the switch that sends the detecting packet to the SDN controller, that is, the above first switch, the port list does not contain information of the port through which the switch receives the detecting packet.

The port list is configured to indicate that the switch sends the detecting packet through each of the downlink ports. In this example, the downlink ports refer to the ports on the switch which connect with a host (a virtual machine or a server).

The detecting packet carries a VLAN ID which is the identifier of the VLAN to which the host initiating the detection belongs. To forward a packet of a specified VLAN, firstly, Permit VLAN may be configured on a port of the switch (i.e., the VLAN ID carried in the packet matches the identifier of the Permit VLAN configured on the port). In this example, the switch may be configured with such a policy that the switch sends a detecting packet through a downlink port without checking whether the VLAN ID carried in the detecting packet matches the identifier of the Permit VLAN configured on the downlink port, when sending the detecting packet through the downlink port.

At block 103: The SDN controller receives a response packet reported by the second switch, where the response packet is sent by the second device to the second switch when the second device receives the detecting packet, and the IP address of the second device matches the destination IP address of the detecting packet.

After the switch sends the detecting packet through the downlink port, a host meeting the condition (i.e., a silent device) may respond to the detecting packet. The "meeting the condition" here indicates that the IP address of the host is the same as the destination IP address carried in the detecting packet.

When responding to the detecting packet, the silent device constructs a response packet to be sent to the switch accessed by the silent device, i.e., the second switch. The response packet is a unicast packet. On the one hand, the second switch may query an MAC table for an egress port according to a destination MAC address carried in the unicast packet (the destination MAC address is the destination MAC address in the Ethernet header of the response packet, and is the MAC address of a host initiating a detection in this example), and forward the packet through the corresponding VXLAN tunnel. On the other hand, the second switch sends the response packet to the SDN controller.

At block 104: The SDN controller sends forwarding configuration information to the second switch so that the second switch configures the port through which the response packet is received according to the forwarding configuration information.

The forwarding configuration information includes the identifier of the Permit VLAN and the mapping information of the Permit VLAN and the VXLAN.

The detecting packet in this example carries the VLAN ID, which is the identifier of the VLAN to which the host initiating the detection belongs; and the response packet also carries the VLAN ID, which is the identifier of the VLAN to which the host making a response (the silent device) belongs. The two VLAN IDs may be the same or different, that is, the first device and the second device may belong to the same VLAN or belong to different VLANs. The identifier of the Permit VLAN described above is the VLAN ID carried in the response packet.

The SDN controller queries a preset entry of a mapping relationship between the Permit VLAN and the VXLAN for the VXLAN ID corresponding to the VLAN ID according to the VLAN ID carried in the response packet, and then generates the forwarding configuration information.

The SDN controller sends the forwarding configuration information to the second switch. The second switch configures the port through which the response packet is received according to the forwarding configuration information. In this way, the detection of the silent device is completed.

If the host initiating the detection and the silent device are in different network segments, it is understood according to the implementation of the existing cross-network ARP protocol that the detecting packet in the Block 101 is sent out by a gateway of the host initiating the detection. Correspondingly, in the Block 103, the destination MAC address in the Ethernet header of the response packet is the MAC address of the gateway.

The flow shown in FIG. 1 will be exemplarily described with reference to FIG. 2 below.

Figure 2:
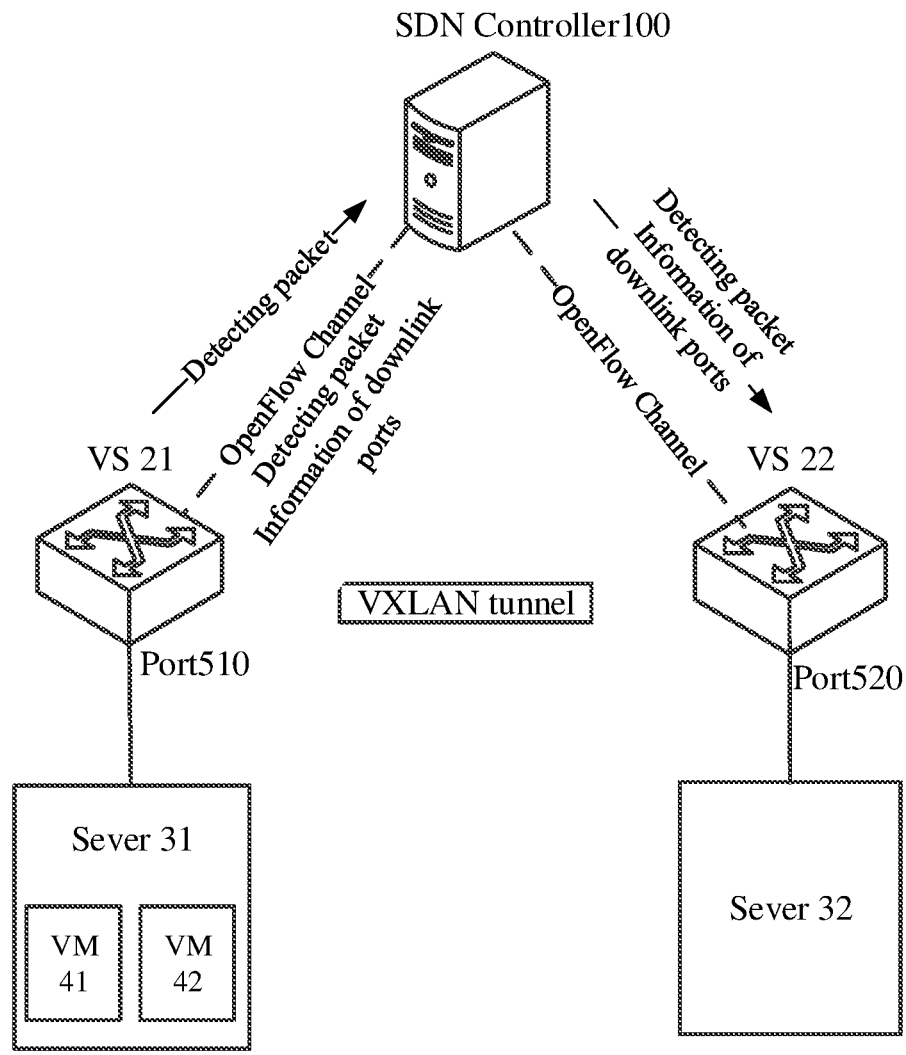
FIG. 2 is a schematic diagram of an SDN in which a method of detecting a silent device is applied according to an example of the present disclosure.

FIG. 2 is a structural schematic diagram of an application scenario of an example provided according to the present disclosure. In FIG. 2, there include a SDN controller 100, switches VS 21 and VS 22, and a host (Sever 31 and Sever 32), wherein, VM 41 and VM 42 which are non-silent devices run on the Sever 31, and the Sever 32 is a silent device. The Sever 31 is connected to the switch VS 21, the Sever 32 is connected to the switch VS 22, the VS 21 has a plurality of downlink ports Port 501-Port 510 (Port 510 only is shown in FIG. 2), and the VS 22 has a plurality of downlink ports Port 511-Port 520 (Port 520 only is shown in FIG. 2). A Vxlan tunnel is established between the VS 21 and the VS 22. When detecting that the VM 41 and the VM 42 get online, the SDN controller 100 distributes, through the OpenFlow Channel, the forwarding configuration information to the Port 510 on the VS 21 accessing the VM 41 and the VM 42, for example, as shown in Table 1:

TABLE 1

| Permit Vlan | Mapping information of Permit Vlan and Vxlan | |
| --- | --- | --- |
| Vlan10 | Vlan10 | Vxlan100 |

In this example, the VM 41 running in Sever 31 accesses the Sever 32 as an example.

The VM 41 sends an ARP request packet. The destination IP address carried in the ARP request packet is the IP address of the Sever 32 (Server 2-IP). The ARP request packet is a broadcast packet. The destination MAC address in the Ethernet header of the broadcast packet is a broadcast address. The ARP request packet carries the identifier of the Vlan to which the VM 31 belongs, which is assumed to be Vlan 10.

When receiving the ARP request packet through the Port 510, VS 21 queries a pre-stored MAC table according to the destination MAC address in the Ethernet header of the ARP request packet. Because the destination MAC address in the Ethernet header is a broadcast address, information of a corresponding egress port cannot be found. Then, the VS 21 may send the ARP request packet to the SDN controller 100 through the OpenFlow Channel.

When receiving the ARP request packet, the SDN controller 100 generates a port list for each of the switches.

Assuming that the downlink ports of the VS 21 further include Port 501-Port 509 (which are not shown), in addition to the Port 510 shown in FIG. 2; and the downlink ports of the VS 22 further include Port 511-Port 519 (which are not shown), in addition to the Port 520 shown in FIG. 2; the port list generated for the VS 21 includes Port 501-Port 509 (Port 510 is the port through which the ARP request packet is received, so Port 510 is not included in the port list); and the port list generated for the VS 22 includes Port 511-Port 520.

The SDN controller 100 encapsulates the port list (Port 501-Port 509) and the ARP request packet into a packet to be sent to the VS 21 through the OpenFlow Channel; and encapsulates the port list (Port 511-Port 520) and the ARP request packet into a packet to be sent to the VS 22 through the OpenFlow Channel.

When receiving the packet sent by the SDN controller through the OpenFlow Channel, the VS 21 and the VS 22 respectively de-encapsulate the packet to obtain the ARP request packet and the port list. According to the preconfigured policy, the VS 21 and the VS 22 may send the ARP request packet according to each downlink port corresponding to the port list without matching the Vlan ID (Vlan 10) carried in the ARP request packet with the identifier of the Permit Vlan configured on each downlink port.

Since the destination IP address of the ARP request packet is Sever 32-IP, other hosts other than the Sever 32 discard the ARP request packet when receiving the packet, while the Sever 32 generates an ARP response packet (carrying the identifier of the VLAN to which the Sever 32 belongs, which is assumed to be Vlan 10) to be sent to the VS 22 when receiving the ARP request packet. Since the port through which the Sever 32 accesses the VS 22 is Port 520, the VS 22 may add the identifier of the Port 520 in the ARP response packet and send it to SDN controller 100 through OpenFlow Channel when receiving the ARP response packet via the Port 520.

When receiving the ARP response packet, the SDN controller 100 may perceive that the Sever 32 gets online, uses the Vlan 10 carried in the ARP response packet as the identifier of the Permit Vlan, and searches the pre-stored mapping relationship table of Permit Vlan and Vxlan for the VxlanID corresponding to the Vlan 10. Assuming that the VxlanID corresponding to the Vlan 10 is Vxlan 100, the SDN controller 100 may generate forwarding configuration information which includes the Vlan 10 and the mapping relationship between the Vlan 10 and the Vxlan 100. The SDN controller then distributes the forwarding configuration information to the VS 22. The VS 22 configures the Port 520 according to the forwarding configuration information.

Thus, the detection of the silent device Sever 32 is completed and the configuration of the port on the VS 22 connecting to the Sever 32 is completed.

Thus, through the method of detecting a device provided by the present disclosure, the SDN controller informs the switch of the detecting packet and the information of the downlink ports so that the switch sends the detecting packet through all of its downlink ports (it is unnecessary to follow the principle of checking the Permit Vlan by the above-mentioned policy setting). Then, as long as the silent device exists in the host accessed by the switch, the silent device may respond to the detecting packet and further implement the related configuration of the Permit Vlan of the access port of the silent device, so that the detection of the silent device is realized and the communication between each host and the silent device in the SDN network may be guaranteed.

Figure 3:
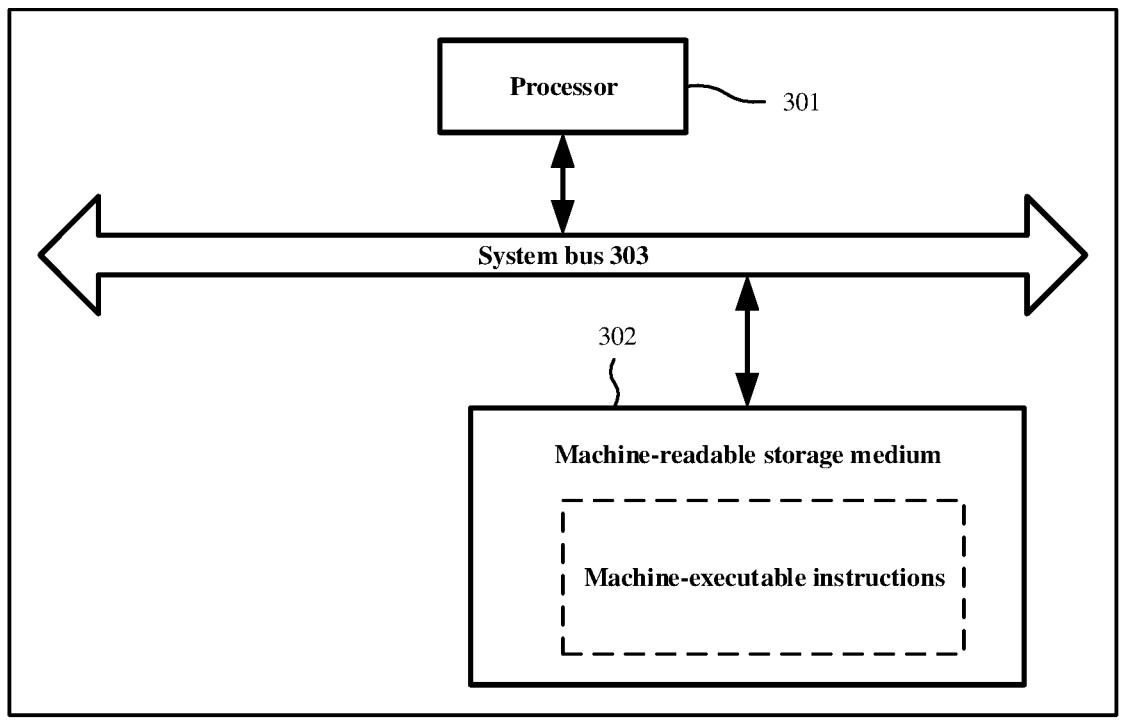
FIG. 3 schematically illustrates a hardware structural diagram of an SDN controller according to an example of the present disclosure.

According to the present disclosure, there is also provided an SDN controller to which the above method of detecting a device may be applied. FIG. 3 schematically illustrates a hardware structural diagram of an SDN controller. The SDN controller may include a processor 301, a machine-readable storage medium 302 stored with machine-executable instructions. The processor 301 and the machine-readable storage medium 302 may communicate with each other via a system bus 303. Moreover, the processor 301 may perform the above method of detecting a device by reading and executing the machine-executable instructions corresponding to a device detecting logic in the machine-readable storage medium 302.

The machine-readable storage medium 302 referred to herein may be any electronic, magnetic, optical, or other physical storage devices in which information may be contained or stored such as executable instructions, data, etc. For example, the machine-readable storage medium may be: a Random Access Memory (RAM), a volatile memory, a non-volatile memory, a flash memory, a storage drive (such as a hard disk drive), a solid state drive, any type of storage discs (such as compact discs, DVDs, etc.), or a similar storage medium, or a combination thereof.

Figure 4:
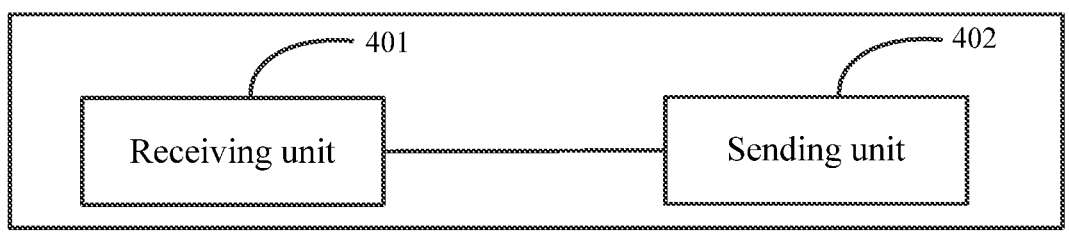
FIG. 4 schematically illustrates a structural diagram of a device detecting logic according to an example of the present disclosure.

As shown in FIG. 4, functionally, the device detecting logic may include the following functional units:

a receiving unit 401 configured to receive a detecting packet initiated by a first device and reported by a first switch; and a sending unit 402 configured to send, for each of switches having an SDN connection with the SDN controller, the detecting packet and information of all downlink ports of the switch to the switch in a way that the switch is capable of sending the detecting packet through a downlink port.

The receiving unit 401 also receives a response packet which is sent by a second switch, and initially generated by a second device in response to receiving the detecting packet from the second switch, wherein an IP address of the second device matches a destination IP address of the detecting packet; and The sending unit 402 also sends forwarding configuration information to the second switch in a way that the second switch is capable of configuring a port through which the response packet is received.

In an example, the detecting packet carries an identifier of a VLAN to which the first device belongs.

In another example, the information of the downlink ports sent to the first switch excludes the information of the port through which the first switch receives the detecting packet.

In yet another example, the response packet carries an identifier of a VLAN to which the second device belongs.

In yet another example, the forwarding configuration information includes: an identifier of a Permit Virtual Local Area Network (Permit VLAN) and mapping information between the Permit VLAN and the Virtual Extensible Local Area Network (VXLAN), where the identifier of the Permit VLAN indicates the VLAN to which the second device belongs.

In yet another example, the detecting packet is an ARP request packet, and the response packet is an ARP response packet.

The processing flow of the SDN controller in the present disclosure may be the same as that of the above method of detecting a device, which will not be described in detail herein.

According to examples of this disclosure, a machine-readable storing medium is also provided. The storing medium stores machine executable instructions which are invoked and executed by the processor to:

receive a detecting packet which is sent by a first switch and initiated by a first device; send, for each of switches having an SDN connection with the SDN controller, the detecting packet and information of all downlink ports of the switch to the switch in a way that the switch is capable of sending the detecting packet through the downlink port;

receive a response packet which is sent by a second switch and initially generated by a second device in response to receiving the detecting packet from the second switch, wherein an IP address of the second device matches a destination IP address of the detecting packet; and send forwarding configuration information to the second switch in a way that the second switch is capable of configuring a port through which the response packet is received.

In an example, the detecting packet carries an identifier of a Virtual Local Area Network (VLAN) to which the first device belongs.

In another example, the information of the downlink ports sent to the first switch excludes information of the port through which the first switch receives the detecting packet.

In another example, the response packet carries an identifier of a VLAN to which the second device belongs.

In another example, the forwarding configuration information comprises an identifier of a Permit VLAN and mapping information between Permit VLAN and Virtual Extensible Local Area Network (VXLAN), the identifier of the Permit VLAN indicates the VLAN to which the second device belongs.

In another example, the detecting packet is an Address Resolution Protocol (ARP) request packet, and the response packet is an ARP response packet.

The foregoing is intended only as a preferred example of the present disclosure and is not intended to be limiting of the present disclosure, and any modifications, equivalent substitutions, improvements, etc., which are made within the spirit and principle of the present disclosure, should fall within the scope of protection of the present disclosure.

The invention claimed is:

1. A method of detecting a device, comprising:
receiving, by a Software Defined Network (SDN) controller, a detecting packet which is sent by a first switch and initiated by a first device accessing the first switch, wherein the detecting packet carries an identifier of a Virtual Local Area Network (VLAN) to which the first device belongs;
sending, by the SDN controller, for each of switches having an SDN connection with the SDN controller, the detecting packet and information of all downlink ports of the switch having an SDN connection with the SDN controller to the switch having an SDN connection with the SDN controller in a way that the switch having an SDN connection with the SDN controller sends the detecting packet through the downlink port without checking whether the identifier of the VLAN carried in the detecting packet matches an identifier of Permit VLAN configured on the downlink port;
receiving, by the SDN controller, a response packet which is sent by a second switch, wherein the response packet is sent by a second device to the second switch accessing the second switch in response to receiving the detecting packet, wherein an Internet Protocol (IP) address of the second device matches a destination IP address of the detecting packet; and sending, by the SDN controller, forwarding configuration information to the second switch in a way that the second switch configures a port through which the response packet is received.

2. The method according to claim 1, wherein the information of the downlink ports sent to the first switch excludes information of the port through which the first switch receives the detecting packet.

3. The method according to claim 1, wherein the response packet carries an identifier of a VLAN to which the second device belongs.

4. The method according to claim 3, wherein the forwarding configuration information comprises an identifier of a Permit VLAN and mapping information between the Permit VLAN and Virtual Extensible Local Area Network (VXLAN), the identifier of the Permit VLAN indicates the VLAN to which the second device belongs.

5. The method according to claim 1, wherein the detecting packet is an Address Resolution Protocol (ARP) request packet, and the response packet is an ARP response packet.

6. A Software Defined Network (SDN) controller, comprising:
a processor; and a non-transitory machine-readable storage medium to store machine-executable instructions which are executable by the processor to:
receive a detecting packet which is sent by a first switch and initiated by a first device accessing the first switch, wherein the detecting packet carries an identifier of a Virtual Local Area Network (VLAN) to which the first device belongs;
send, for each of switches having an SDN connection with the SDN controller, the detecting packet and information of all downlink ports of the switch having an SDN connection with the SDN controller to the switch having an SDN connection with the SDN controller in a way that the switch having an SDN connection with the SDN controller sends the detecting packet through the downlink port without checking whether the identifier of the VLAN carried in the detecting packet matches an identifier of Permit VLAN configured on the downlink port;
receive a response packet which is sent by a second switch, wherein the response packet is sent by a second device accessing the second switch to the second switch in response to receiving the detecting packet, wherein an Internet Protocol (IP) address of the second device matches a destination IP address of the detecting packet; and send forwarding configuration information to the second switch in a way that the second switch configures a port through which the response packet is received.

7. The SDN controller according to claim 6, wherein, the information of the downlink ports sent to the first switch excludes information of the port through which the first switch receives the detecting packet.

8. The SDN controller according to claim 6, wherein, the response packet carries an identifier of a VLAN to which the second device belongs.

9. The SDN controller according to claim 8, wherein the forwarding configuration information comprises an identifier of Permit VLAN and mapping information between the Permit VLAN and Virtual Extensible Local Area Network (VXLAN), the identifier of the Permit VLAN indicates the VLAN to which the second device belongs.

10. The SDN controller according to claim 6, wherein, the detecting packet is an Address Resolution Protocol (ARP) request packet, and the response packet is an ARP response packet.

11. A non-transitory machine-readable storage medium storing machine executable instructions which are invoked and executed by the processor to:
- receive a detecting packet which is sent by a first switch and initiated by a first device accessing the first switch, wherein the detecting packet carries an identifier of a Virtual Local Area Network (VLAN) to which the first device belongs;
- send, for each of switches having an Software Defined Network (SDN) connection with the SDN controller, the detecting packet and information of all downlink ports of the switch having an SDN connection with the SDN controller to the switch having an SDN connection with the SDN controller in a way that the switch sends the detecting packet through the downlink port without checking whether the identifier of the VLAN carried in the detecting packet matches an identifier of Permit VLAN configured on the downlink port;
- receive a response packet which is sent by a second switch, wherein the response packet is sent by a second device accessing the second switch to the second switch in response to receiving the detecting packet, wherein an Internet Protocol (IP) address of the second device matches a destination IP address of the detecting packet; and send forwarding configuration information to the second switch in a way that the second switch configures a port through which the response packet is received.

12. The non-transitory machine-readable storage medium according to claim 11, wherein,
- the response packet carries an identifier of a VLAN to which the second device belongs.

13. The non-transitory machine-readable storage medium according to claim 12, wherein,
- the forwarding configuration information comprises an identifier of Permit VLAN and mapping information between the Permit VLAN and Virtual Extensible Local Area Network (VXLAN);
- the identifier of the Permit VLAN indicates the VLAN to which the second device belongs.

* * * * *